(12) United States Patent
Chyou et al.

(10) Patent No.: US 9,457,264 B1
(45) Date of Patent: Oct. 4, 2016

(54) SYSTEM AND METHOD FOR PROVIDING SPEED-UP QUEST OFFERS TO USERS DURING IDLE TIME

(71) Applicant: KABAM, INC., San Francisco, CA (US)

(72) Inventors: Wynne Chyou, San Francisco, CA (US); John Kim, San Francisco, CA (US); Bryan Tsao, San Carlos, CA (US); Kevin Chanthasiriphan, San Francisco, CA (US); Chris Yu, San Francisco, CA (US)

(73) Assignee: KABAM, INC., San Francisco, CA (US)

( * ) Notice: Subject to any disclaimer, the term of this patent is extended or adjusted under 35 U.S.C. 154(b) by 0 days.

(21) Appl. No.: 14/203,411

(22) Filed: Mar. 10, 2014

(51) Int. Cl.
*A63F 9/24* (2006.01)
*A63F 13/30* (2014.01)

(52) U.S. Cl.
CPC ..................................... *A63F 13/12* (2013.01)

(58) Field of Classification Search
CPC ........ A63F 13/23; A63F 13/52; A63F 13/10; A63F 13/12
See application file for complete search history.

(56) References Cited

U.S. PATENT DOCUMENTS

| | | | |
|---|---|---|---|
| 5,649,862 A | 7/1997 | Sakaguchi | |
| 5,781,894 A | 7/1998 | Petrecca | |
| 6,196,920 B1 | 3/2001 | Spaur | |
| 6,615,175 B1 | 9/2003 | Gazdzinski | |
| 6,616,533 B1 | 9/2003 | Rashkovskiy | |
| 6,709,335 B2 | 3/2004 | Bates | |
| 7,729,946 B2 | 6/2010 | Chu | |
| 8,107,940 B1 | 1/2012 | Jackson | |
| 8,360,873 B1 | 1/2013 | Wickett | |
| 8,449,385 B2 | 5/2013 | Mosites | |
| 8,814,662 B1 | 8/2014 | Lall | |
| 2003/0060247 A1 | 3/2003 | Goldberg | |
| 2004/0148221 A1 | 7/2004 | Chu | |
| 2006/0135232 A1 | 6/2006 | Willis | |
| 2007/0265046 A1 | 11/2007 | Sato | |

(Continued)

OTHER PUBLICATIONS

GOW_levelup.pdf, Machine Zone, Jan. 1, 2014, at http://apphero-ics.com/gameofwarlevelup, pp. 1-4.*

(Continued)

*Primary Examiner* — Steve Rowland
(74) *Attorney, Agent, or Firm* — Sheppard Mullin Richter & Hampton LLP

(57) ABSTRACT

A system and method for executing an instance of an online game to facilitate participation of the user in the online game. The system and method include executing actions in the instance of the online game that are delayed from reception of corresponding action requests by wait times associated with the actions. The system and method include effectuating presentation of speed-up quest offers to the user for wait times that are open. The system and method include detecting successful performance of speed-up quests by the user in the online game and implementing speed-ups associated with the speed-up quest offers on open wait times in the online game in response to successful performance of offered speed-up quests by the user in the online game. The system and method include in response to detection of successful performance of the first quest in the online game during the first open wait time implementing a first speed-up by reducing the first open wait time.

38 Claims, 6 Drawing Sheets

(56) References Cited

U.S. PATENT DOCUMENTS

| | | |
|---|---|---|
| 2009/0258687 A1 | 10/2009 | Weichselbaum |
| 2009/0313117 A1 | 12/2009 | Hu |
| 2011/0161790 A1 | 6/2011 | Junior |
| 2011/0207529 A1 | 8/2011 | Acres |
| 2012/0244945 A1 | 9/2012 | Kolo et al. .................. 463/42 |
| 2012/0289316 A1 | 11/2012 | Van Luchene ............... 463/25 |
| 2012/0290409 A1 | 11/2012 | Pradeep |
| 2012/0315993 A1 | 12/2012 | Dumont |
| 2013/0014182 A1 | 1/2013 | Nussel |
| 2013/0217489 A1 | 8/2013 | Bendayan |
| 2014/0214506 A1 | 7/2014 | VanLuchene |
| 2014/0249926 A1 | 9/2014 | Wallace |

OTHER PUBLICATIONS

Leviathyn I Thirst of Night Review—Leviathyn [Retrieved online on Feb. 4, 2014] URL http://leviathyn.com/pc/2012/05/18/review-thirst-of-night-2/.

Video Button to Earn Speedups . . . —Game Support by Players for Players.. [Retrieved online on Feb. 4, 2014] URL http://forums.playdemic.com/index.php?/topic/11666-video-button-to-earn-speedups/.

Speedups.JPG [Retrieved online Feb. 4, 2014] URL Supportkq.playdemic.com/Faq/?cat=General.

\* cited by examiner

FIG.
2

SYSTEM AND METHOD FOR PROVIDING SPEED-UP QUEST OFFERS TO USERS DURING IDLE TIME

FIELD OF THE DISCLOSURE

This disclosure relates to providing speed-up quest offers to users during an idle time in a virtual space.

BACKGROUND

Providing speed-ups of gaming actions upon receipt of payment by users in virtual spaces is known; however, conventional systems do not provide speed-up quest offers to reduce idle time in virtual spaces.

SUMMARY

One aspect of the disclosure relates to a system and method configured to speed up game actions requiring a wait time in an online game. In some implementations, the system and method include executing an instance of an online game, and implementing the instance of the online game to facilitate participation of the user in the online game via a client computing platform. Facilitating participation in the online game includes executing actions in the instance of the online game in response to receiving action requests from the user. Execution of the actions is delayed from reception of corresponding action requests by wait times associated with the actions. In some implementations, the system and method include effectuating presentation on the client computing platform of speed-up quest offers to the user for wait times that are open, wherein a first speed-up quest offer sets forth a first quest performable by the user in the online game during a first open wait time for an associated first action requested by the user. In some implementations, the system and method include detecting successful performance of speed-up quests by the user in the online game. In some implementations, the system and method include implementing speed-ups associated with the speed-up quest offers on open wait times in the online game in response to successful performance of offered speed-up quests by the user in the online game such that in response to detection by the quest monitoring component of successful performance of the first quest in the online game during the first open wait time, the speed-up implementation component implements a first speed-up by reducing the first open wait time.

In exemplary implementations, speeding up game actions requiring a wait time in an online game may be performed by processors executing computer program components. In some implementations, the system may include one or more servers. The server(s) may be configured to communicate with one or more client computing platforms according to a client/server architecture. The users may access the system via the client computing platforms, for instance, to engage in one or more games.

The server(s) may be configured to execute one or more computer program components to provide one or more games to users (or players). The computer program components may include one or more of a game component, a user profile management component, a speed-up quest offer management component, a quest monitoring component, a speed-up implementation component, and/or other components. It is noted that the client computing platforms may include one or more computer program components that are the same as or similar to the computer program components of the server(s) to facilitate individualized content made available to the users of online games.

The user profile management component may be configured to manage user profiles of one or more users of the online game.

The game component may be configured to execute an instance of an online game, and to implement the instance of the online game to facilitate participation of the user in the online game via a client computing platform, wherein facilitating participation in the online game includes executing actions in the instance of the online game in response to receiving action requests from the user, and wherein execution of the actions are delayed from reception of corresponding action requests by wait times associated with the actions.

The speed-up quest offer management component may be configured to effectuate presentation on the client computing platform of speed-up quest offers to the user for wait times that are open, wherein a first speed-up quest offer sets forth a first quest performable by the user in the online game during a first open wait time for an associated first action requested by the user.

The quest monitoring component may be configured to detect successful performance of speed-up quests by the user in the online game.

The speed-up implementation component may be configured to implement speed-ups associated with the speed-up quest offers on open wait times in the online game in response to successful performance of offered speed-up quests by the user in the online game such that in response to detection by the quest monitoring component of successful performance of the first quest in the online game during the first open wait time, the speed-up implementation component implements a first speed-up by reducing the first open wait time.

One aspect of the disclosure relates to a computer-implemented method for speeding up game activity requiring a wait time in an online game, the method being implemented in a computer system that includes one or more physical processors and storage media storing machine-readable instructions. The method may be implemented in a computer system that includes one or more physical processors and storage media storing machine-readable instructions. The method includes managing user profiles of one or more users of the online game, and executing an instance of an online game. The method further includes implementing the instance of the online game to facilitate participation of the user in the online game. The method further includes executing actions in the instance of the online game in response to receiving action requests from the user, wherein execution of the actions are delayed from reception of corresponding action requests by wait times associated with the actions. The method further includes effectuating presentation on the client computing platform of speed-up quest offers to the user for wait times that are open, wherein a first speed-up quest offer sets forth a first quest performable by the user in the online game during a first open wait time for an associated first action requested by the user. The method further includes detecting successful performance of speed-up quests by the user in the online game. The method further includes implementing speed-ups associated with the speed-up quest offers on open wait times in the online game in response to successful performance of offered speed-up quests by the user in the online game such that in response to detection by the quest monitoring component of successful performance of the first quest in the online game during the first open wait time, implementing a first speed-up by reducing the first open wait time.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
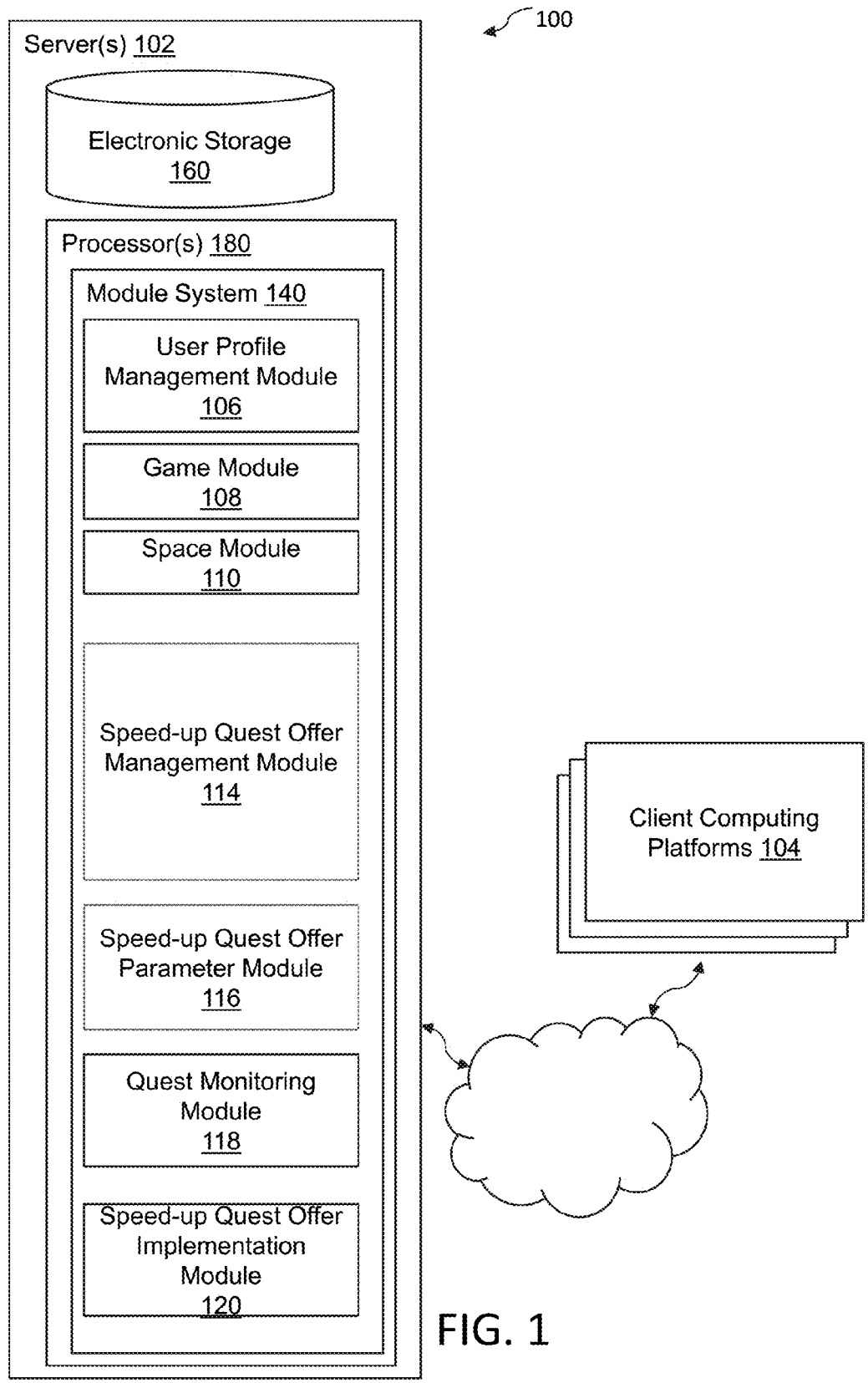
FIG. 1 illustrates a system configured to provide a virtual space, in accordance with one or more implementations.

FIG. 1 illustrates a system 100 configured to provide a virtual space to users. Providing the virtual space may include hosting the virtual space over a network. In some implementations, system 100 may include one or more servers 102. Server 102 may be configured to communicate with one or more client computing platforms 104 according to a client/server architecture. Users may access system 100 and/or the virtual space via client computing platforms 104.

The server 102 may be configured to execute one or more computer program components. The computer program components may include one or more of a user profile management component 106, a game component 108, a space component 110, a speed-up quest offer management component 114, a speed-up quest offer parameter component 116, a quest monitoring component 118, a speed-up quest offer implementation component 120, and/or other components. The client computing platform(s) 104 may include one or more computer program components that are the same as or similar to the computer program components of the example server(s) 102 to provide a virtual space to users and to facilitate in-game actions.

The user profile management component 106 may be configured to manage user profiles. Different users may have profiles associated with different game levels, entities, etc. Game entities include game characters, objects, simulated physical phenomena (e.g., wind, rain, earthquakes, and/or other phenomena), and/or other elements within the virtual space to interact with the virtual space and/or each other. Game elements include bases, forts, tanks, transport devices, cities, armies, soldiers, a wizard, an elf, or anything listed herein or externally that may be part of an online game. It is impractical to list all game objects, so any existing game object at time of filing or later is inferred as being a game entity.

A user profile management component 106 may be configured to record user profiles and/or user parameters associated with users of the system 100. The one or more user profiles and/or user information may include information stored by server 102, one or more of the client computing platforms 104, and/or other storage location. The user profiles may include, for example, past responses to speed-up quest offer(s), auxiliary content, information identifying users (e.g., a username or handle, a number, an identifier, and/or other identifying information) within the virtual space, virtual space account information, subscription information, virtual currency account information (e.g., related to currency held in credit for a user), virtual space usage information, interaction history among users in the virtual space, information stated by users, browsing history of users, a client computing platform identification associated with a user, a phone number associated with a user, and/or other information related to users.

The user profile management component 106 may also be configured to obtain values of user parameters for individual users. The user parameters may include one or more of a demographic parameter, a social parameter, a game parameter, a purchase parameter, an auxiliary content response parameter, a speed-up quest offer content response parameter, and/or other parameters. A demographic parameter may include one or more of age, sex, geographic location, language, income, education, career, marital status, and/or other demographic parameters. A social parameter may include one or more of a parameter derived from a social graph in a social network service, an in-game relationship, a platform from which the virtual space is accessed, and/or other social parameters. A game parameter may include one or more of an entity class, an entity faction, a usage amount, one or more usage times, a level, inventory in the virtual space, a score, and/or other game parameters. A purchase parameter may include a parameter determined from a purchase history of the user in the virtual space. An auxiliary content response parameter may include a one or more of a user's response to past auxiliary content, past auxiliary content, types of past auxiliary content, and/or other parameters. A speed-up quest offer(s) content response parameter may include a one or more of a user's response to past speed-up quest offer(s) content, past speed-up quest offer(s) content, types of past speed-up quest offer(s) content, and/or other parameters.

In an implementation, the game component 108 may be configured to execute an instance of an online game, and to implement the instance of the online game to facilitate participation of users in the online game via a client computing platform 104. Participation in the online game includes executing actions in the instance of the online game in response to receiving action requests from a user. Execution of some actions may be delayed from reception of a corresponding action request by a wait time, which is associated with the action.

Space component 110 may be configured to implement an instance of the virtual space executed by the computer components. The instance of the virtual space may reflect the state of the virtual space. The instance of the virtual space may be used to push state information to clients (e.g., client computing platforms 104) for implementation on the client, may be used to verify state information generated on client executing expressions of the instance locally, and/or for other purposes. State information may include information about the state of the virtual space such as, without limitation, position information of one or more objects, topography information, object status/shape information, battle information, score information, user or character progress information, user inventory information, user or character resource information, progress information for one or more activities or actions, view information describing a view of the virtual space, and/or other information that describes the state of the virtual space. Expressions of the instance executed on the client facilitate presentation of views on the client of the virtual space. Expressions of the instance executed on the client may be configured to simply present views of the virtual space based on the state information (e.g., via streaming view information, object/position information, and/or other state information) received from space component 110. Expressions of the instance executed on the client may include space logic that effectively provides for execution of a limited version of the instance on a client that is synchronized and/or verified with state information received from space component 110. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the virtual space may comprise one or more user selectable actions. A user selectable action may be associated with a wait time. A wait time associated with an action may prevent an execution of a number of corresponding actions for an amount of time after receiving a request for the action. In a virtual space such as an online game, a wait time may be associated with a time required to complete an action. In such cases, an action may comprise, for example, developing a skill, building, crafting, modifying, upgrading, trading, selling, and/or repairing an item, an equipment, a building, and/or a structure; training, building, modifying, healing, requesting, upgrading, selling, and/or repairing an in-game unit; harvesting, refining, trading, selling, developing, spending, and/or consuming an in-game resource; using, performing, developing, modifying, upgrading, and/or training a skill, ability, and/or attribute; completing in-game travel, reloading a weapon, receiving assistance such as a hint and/or a clue, researching a technology a user wants to develop or to unlock in a game or dedicating resources and/or researchers to researching that technology, which may in turn lead to more technology development, and/or other actions.

For example, in a game involving building virtual structures, a wait time may be associated with the time it takes for a virtual structure to be built, upgraded, and/or repaired. In another example involving a game with an aspect related to the development of a character, a wait time may be associated with the time it takes to use a skill and/or an ability such as a melee attack or a spell; and/or to interact with another player and/or a non-player character. In yet another example involving a game with an aspect related to the development of an army, a wait time may be associated with the time it takes to harvest resources and/or to build units.

A wait time may also be associated with a time required to recover from completing an in-game action. In such cases, an action may comprise, for example, developing a skill, building, crafting, modifying, upgrading, trading, selling, and/or repairing an item, an equipment, a building, and/or a structure; training, building, modifying, healing, requesting, upgrading, selling, and/or repairing an in-game unit; harvesting, refining, trading, selling, developing, spending, and/or consuming an in-game resource; using, performing, developing, modifying, upgrading, and/or training a skill, ability, and/or attribute; completing in-game travel, reloading a weapon, receiving assistance such as a hint and/or a clue, and/or other actions. For example, in a game involving building virtual structures, a wait time may be associated with the time it takes to recover the amount of resources spent when building, upgrading, and/or repairing a virtual structure. In another example involving a game with an aspect related to the development of a character, a wait time may be associated with the time it takes to recover energy used when activating a skill and/or an ability such as a melee attack or a spell; and/or to interact with another player and/or an non-player character. In yet another example involving a game with an aspect related to the development of an army, a wait time may be associated with the time it takes recover from requesting special limited use units, abilities, and/or powers.

In some cases, a wait time may be associated with a time required to both complete an action and recover from completing the action. In addition, a person of skill in the art will appreciate that a wait time may be static or dynamic depending on the conditions of the game. For instance and without limitation, a wait time may depend on the number of other players requesting the same action and/or a similar action type. A person of skill in the art will further appreciate that in some cases a virtual space may allow a player to queue action requests. In such cases, the wait time may be the wait time associated with one or more actions in the queue. The game component 108 may have a single queue for the game action that requires an associated game wait time. The game component 108 may have multiple queues for the game action that requires a respective game wait time. The game component 108 may have multiple queues for multiple game actions, each of which requires a respective game wait time.

In some instances, wait times may be shortened or eliminated through the use of accelerators, which may be referred to as speed-ups as they are used to speed-up gameplay including game actions. Speed-ups may include, for example, effects of actions taken by other players, the use of an in-game item, spending in-game money and/or resources, spending real world currency, spending earned or purchased, using an in-game power-up, and/or other speed-ups. Speed-ups may shorten wait time by, without limitation, reducing the overall wait time, accelerating the speed with which the wait time passes, shifting the wait time to another action, eliminating the wait time, and/or other methods.

In yet other instances, wait times may be lengthened through the use of penalties. Penalties may include, for example, effects of actions taken by other players, the use of an in-game item, spending in-game money and/or resources, spending real world currency, spending earned or purchased, using an in-game power-up, and/or other penalties. Penalties may lengthen a wait time by, without limitation, increasing the overall wait time, decreasing the speed with which the wait time passes, shifting the wait time from another action, and/or other methods.

Wait time translates to a time when the user is standing by idle. If idle time is too long a user may leave the game or lose interest. In some instances, the amount of wait time remaining may be presented to the user of the virtual space. In a setting, such as a game, the wait time may be presented as a countdown timer, a progress bar, a mask and overlaying an action request and indicating it may not be selected, and/or other methods of presenting a wait time.

In some cases, wait times may apply to subsequent requests of the same action, and in yet other cases, wait times may apply to subsequent requests of the same action type. Action types may include building structures, items, equipment, and/or units; upgrading structures, items, equipment, and/or units; repairing structures, items, equipment, and/or units; upgrading skills and/or abilities; utilizing skills and/or abilities; harvesting resources; researching technology; trading items, equipment, and/or resources; traveling; and/or other action types.

Within the instance of the virtual space executed by space component 110, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user with which it is associated may control the user character. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through space component 110).

The instance of the virtual space and/or the online game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, changes to the virtual items available for use in the online game, and/or other changes.

The above description of the views of the virtual space determined from the instance executed by space component 110 is not intended to be limiting. The virtual space may be presented in a more limited, or richer, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the limited set of graphics. For example, a view may include a generic battle graphic with a textual description of the opponents to be confronted. Other representations of individual places within the virtual space are contemplated.

For example, a user may select an action, which may be associated with a wait time, causing the wait time to be activated and open. When the wait time is open, the gaming component 108 may prevent an execution of a number of corresponding actions for an amount of time after receiving a request for the action. A user may be interested in speed-up gameplay by accepting a speed-up offer that requires payment. Some users may not want to pay to speed-up play. Some users may be interested in performing quests that upon completion will result in a speed-up or completion of the gameplay that is stopped or on hold waiting for the open wait time(s) to expire. A speed-up quest offer management component 114 may be configured to effectuate presentation on the client computing platform 104 of speed-up quest offers to the user for wait times that are open. A speed-up quest offer may include a set of one or more quests that are specific to the wait time to be sped up and/or the action to be performed. A first speed-up quest offer sets forth a first quest performable by the user in the online game during a first open wait time for an associated first action requested by the user. A speed-up quest offer includes an option for the user to select engagement in a quest that is separate from the game action that requires an associated game wait time.

A speed-up quest offer management component 114 may be configured to generate a speed-up quest offer based on parameters including parameters determined by the user's profile parameters, a user's quest parameters, parameters of the instance of the online game, and/or other parameters. For example, the speed-up quest offer management component 114 may generate a quest of the same type as past speed-up quest offers that elicited a response from a user. In another example, the speed-up quest offer management component 114 may generate a speed-up quest offer of a different type than past speed-up quest offer that did not elicit a response from a user. In yet another example, the speed-up quest offer management component 114 may generate a speed-up quest offer based on a user's demographic information. These and other embodiments of parameters described herein and elsewise known to one of ordinary skill in the art are contemplated.

A speed-up quest offer parameter component 116 may be used to store and update the parameters used to determine whether and what type of speed-up quest offer to present to a user. A speed-up quest offer management component 114 may be configured to determine whether and what type of speed-up quest offer to generate, based upon the instance of the online game and any stored speed-up quest parameters and/or other parameters. A speed-up quest offer management component 114 may be configured to determine whether to generate a speed-up quest offer, based upon the instance of the online game. A speed-up quest offer management component 114 may be configured to determine whether to generate a speed-up quest offer, based upon a level associated with a game entity associated with and/or controlled by the user.

A speed-up quest offer management component 114 may be configured to manage one or more speed-up quest offers per user. A speed-up quest offer management component 114 may be configured to effectuate presentation of a speed-up quest offer wall rendering on the client computing platform 104. The speed-up quest offer wall rendering includes detailed information about individual ones of the multiple speed-up quest offers. The detailed information about an individual speed-up quest offer includes content of the speed-up quest offer. The speed-up quest offer management component 114 may be configured to display a speed-up quest offer wall or other notice of a single or multiple speed-up quest offer(s). A notice may include content of one or more speed-up quest offers during an idle time detected by speed-up quest offer management component 114. A notice of the speed-up quest offer(s) may be incorporated into the view information used by space component 110. In some instances, the speed-up quest offer(s) notice or speed-up quest offer wall may be displayed as, for example, a popup window, a message, an alert, a banner, a decision, a tooltip, a question, and/or other methods for display.

In some instances the online game is a strategy game. In some instances the online game is a strategy game and the game action that requires an associated game wait time is building a base. In some instances the online game is a strategy game and the game action that requires an associated game wait time is training troops. In some instances game action that requires an associated game wait time is performing an upgrade.

In some instances, a speed-up quest includes controlling game entities in the online game to perform one or more activities in the online game. In some instances, the speed-up quest offer is not configured to be activated by payment or use of game resources. In some instances, the speed-up quest offer is not configured to be activated by use of game resources as payment. In some instances, the speed-up quest offer is not configured to be activated by hovering over an icon. In some instances, the speed-up quest offer is not configured to be activated by watching advertising. In some instances, the speed-up quest offer is not configured to be activated by winning a luck game. In some instances, the online game is a strategy game and the speed up quest offer is configured to be activated by controlling game entities in the online game to perform one or more activities in the online game and any one of: payment or use of game resources or hovering over an icon or watching advertising or winning a luck game.

A speed-up quest offer management component 114 may generate a speed-up quest offer(s). A speed-up quest offer management component 114 may offer a quest that if accepted and if completed causes one or more of a current active wait time in the instance of the game to be accelerated or completed so that a user may experience less idle time. The quests, which the management component 114 makes available, may include any quests that are part of the online game, newly formulated quests, updated quests, user designed quest, etc.

A speed-up quest offer management component 114 may be configured to track the responses of users to speed-up quest offer(s). For example, tracking the responses may include tracking whether there is a response to any of speed-up quest offer(s) content, the speed-up quest offer(s) content sent to the user, the type of speed-up quest offer(s) content sent to the user, the time before the user responded to the speed-up quest offer(s) content, the time spent responding to the speed-up quest offer(s) content, the user's level of interest in the speed-up quest offer(s) content (e.g., by detecting if the user ever hovered around the speed-up quest offer wall or notice, and/or tracking metrics). A completed speed-up quest may shorten wait time by, without limitation, reducing the overall wait time, accelerating the speed with which the wait time passes, shifting the wait time to another action, eliminating the wait time, and/or other methods.

In some implementations, the server 102 and client computing platforms 104 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102 and client computing platforms 104 may be operatively linked via some other communication media.

A given client computing platform 104 may include one or more processors configured to execute computer program components. The computer program components may be configured to enable an expert or user associated with the given client computing platform 104 to interface with server 102, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

Server 102 may include electronic storage 160, one or more processors 180, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 160 may comprise non-transitory storage media that electronically stores information. The electronic storage media of electronic storage 160 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 160 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 160 may include one or more virtual storage resources (e.g., cloud storage, a virtual private network, and/or other virtual storage resources). Electronic storage 160 may store software algorithms, information determined by processor 180, information received from server 12, information received from client computing platforms 104, and/or other information that enables server 102 to function as described herein.

Processor(s) 120 is configured to provide information processing capabilities in server 102. As such, processor 180 may include one or more of a digital processor, an analog processor, a digital circuit designed to process information, an analog circuit designed to process information, a state machine, and/or other mechanisms for electronically processing information. Although processor 180 is shown in FIG. 1 as a single entity, this is for illustrative purposes only. In some implementations, processor 180 may include a plurality of processing units. These processing units may be physically located within the same device, or processor 180 may represent processing functionality of a plurality of devices operating in coordination. The processor 180 may be configured to execute components 106, 108, 110, 114, 116, 118, and 120. Processor 180 may be configured to execute components 106, 108, 110, 114, 116, 118, and 120 by software; hardware; firmware; some combination of software, hardware, and/or firmware; and/or other mechanisms for configuring processing capabilities on processor 180. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 106, 108, 110, 114, 116, 118, and 120 are illustrated in FIG. 1 as being implemented within a system 140 implemented by a single processing unit, in implementations in which processor 180 includes multiple processing units, one or more of components 106, 108, 110, 114, 116, 118, and 120 may be implemented remotely from the other components. The description of the functionality provided by the different components 106, 108, 110, 114, 116, 118, and 120 described below is for illustrative purposes, and is not intended to be limiting, as any of components 106, 108, 110, 114, 116, 118, and 120 may provide more or less functionality than is described. For example, one or more of components 106, 108, 110, 114, 116, 118, and 120 may be eliminated, and some or all of its functionality may be provided by other ones of components 106, 108, 110, 114, 116, 118, and 120. As another example, processor 180 may be configured to execute one or more additional components that may perform some or all of the functionality attributed below to one of components 106, 108, 110, 114, 116, 118, and 120.

Figure 2:
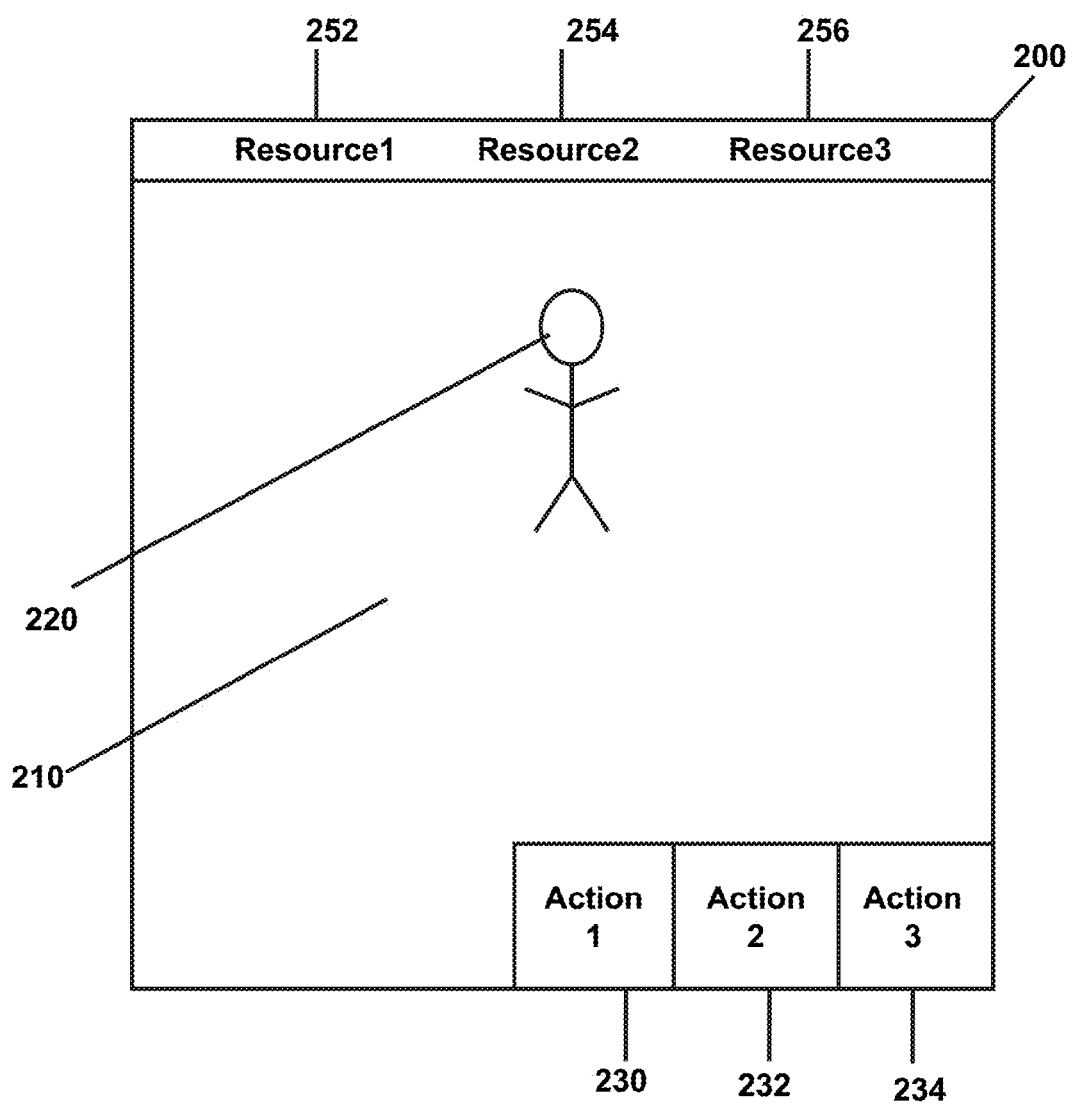
FIG. 2 illustrates a virtual space interface.

FIG. 2 illustrates an embodiment of a virtual space interface 200, which may be used to facilitate in game actions via computing platform 104. For example, the user controls a gaming entity 220. The space component 110 may present the user with a number of possible in game actions, e.g., 230, 232, 234 at any instance of the game. Virtual space interface 200 may be configured to display a virtual space 210 including game entities as described herein. A user may have acquired one or more resources 252, 254, 256 while playing the game. A user may select a first action 230 that is associated to a first game wait time. A second action 232 may be associated with a second game wait time, and a third action 234 may be associated with a third game wait time. Any number or actions and associated game wait times may be designed for according to the limits of an example component system 140 or a more distributed system 100, or a larger system 100 that may be further distributed across one or more client computing platform(s) 104. Other layouts of virtual space interface 200 are contemplated. The example embodiment illustrates in game actions that may be selected via the virtual space interface 200. Other forms of game action selection are contemplated with the disclosure described herein, such as other local or remote input for in game action selection.

Figure 3:
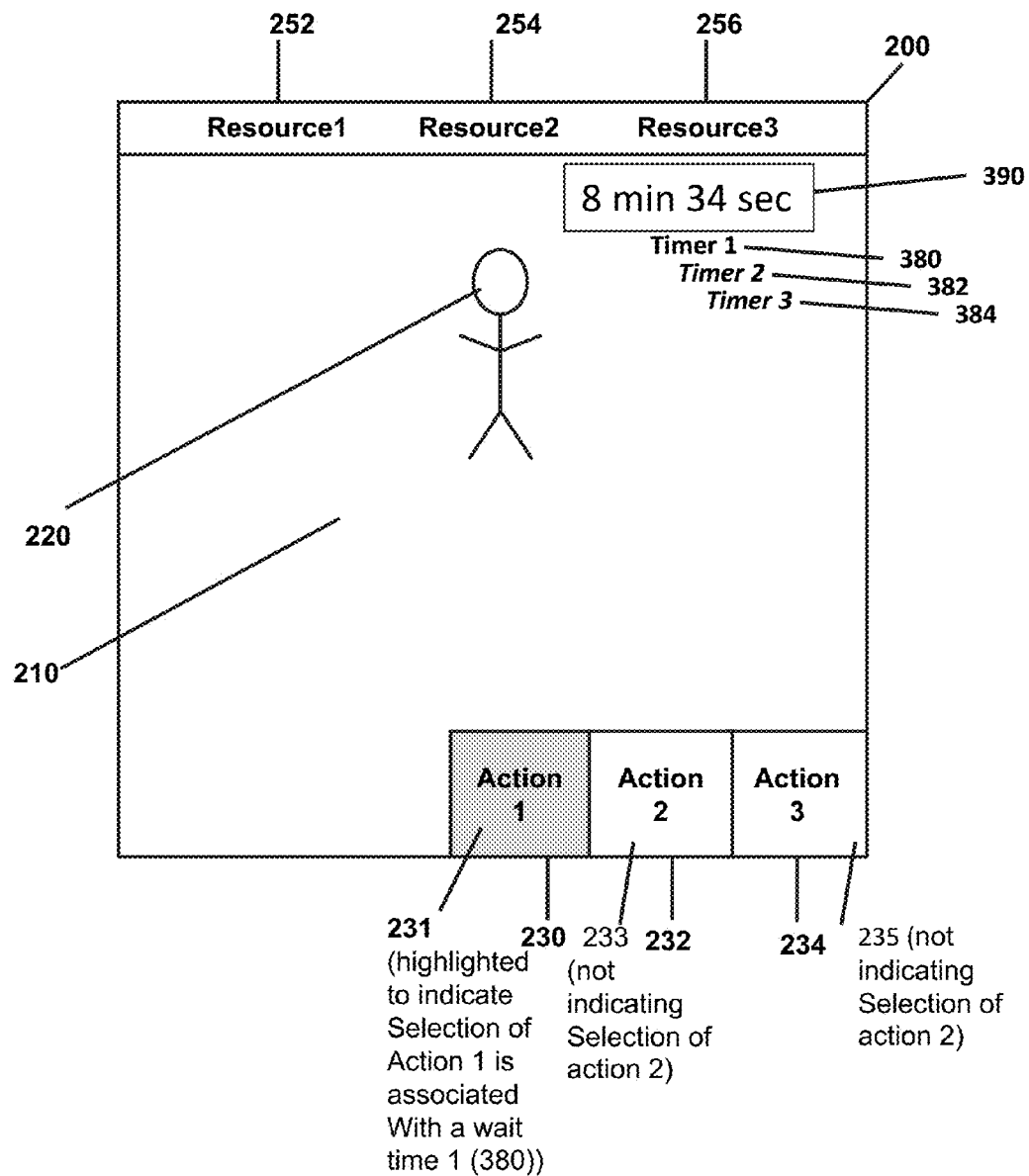
FIG. 3 illustrates a virtual space interface wherein a user has selected an action associated with a wait time.

FIG. 3 illustrates an embodiment of a virtual space interface 200 after a user has selected a first action 230. Virtual space interface 200 may display a wait time 380 associated with selected action 230. Virtual space interface 200 may indicate action 230 is selected with an indicator 231, e.g. the action becomes highlighted. Indicator 231 may also indicate that action 230 may not be selected for some time. A user may be prevented from selecting a selected action 230 for some duration of time. The duration of time may be greater than, less than, or equal to the time indicated by timer 380. Timer 380 is an example of a first wait time 380 that may be presented to the user by a first timer presentation 390.

Game component 108 may be configured to detect idle periods of time based on wait times associated with action requests and/or other periods of inactivity. Game component 108 may present a first wait time 380 via presentation 390. Game component 108 may be configured to track a remaining action time of a game wait time, e.g. first wait time 380. For example, game component 108 may present a count down time as a first wait time runs out. The game action may be building a fort, which for example may be associated with a wait time of 10 minutes. A game component may present a wait time (e.g., 10 minute wait time) start to be counted down and presented to the user via a first wait time presentation 390. A game component 108 may prevent a user from further action (e.g., first action 230 that is on hold, e.g., building action). Also, a game component 108 may set a first action (e.g., action 1) indicator 231 as highlighted to indicate that no more building action may be done until the associated first timer 380 runs out. For example, as illustrated in FIG. 3, a game component 108 may present a first timer 380 time, e.g., 8 min 34 seconds with a first timer presentation 390, which may be updated as the wait time runs out.

The game component 108 may manage more than one game action at a time. For example, a user may choose to build a base as a first action, train troops as a second action, and heal a powerful character as a third action. More or less number of actions, and other game actions are in the scope of embodiments described herein. For example, virtual space interface 200 may display a timer (e.g., 380, 382, 384) with respective presentations (not all shown) each of which is respectively associated with each action (e.g., 230, 232, 234). Example timer parameters, timer 1, timer 2, timer 3, are illustrated in FIG. 3 as background information of what example processes may be running. In this example, the timer parameters are shown for understanding purposes and are not presented on the virtual space interface 200 unless the timer is active. In this example, the first timer is active and as such is presented with the first timer presentation 390.

Virtual space interface 200 may indicate each action is selected with respective indicators 231, 233, 235. Likewise, an indicator 231, 233, and 235 may indicate that each respective action 230, 232, and 234 may not be selected. A user may be prevented from selecting an action 230, 232, 234 for some duration of time. Example durations of time may be greater than, less than, or equal to the time indicated by associated timers 380, 382, and 384.

As stated above, game component 108 may keep track of idle time parameters. For example, as illustrated in FIG. 3, a user has selected, as a first action, building a fort that will take 10 minutes of wait time. The 10 minutes of wait time may be included in a total idle wait time parameter. For example, when the total idle wait time parameter exceeds a threshold of a total time duration, the game component 108 may cause a speed-up quest offer management component 114 to effectuate presentation on the client computing platform 104 of one or more speed-up quest offers to the user for wait times that are open.

Figure 4:
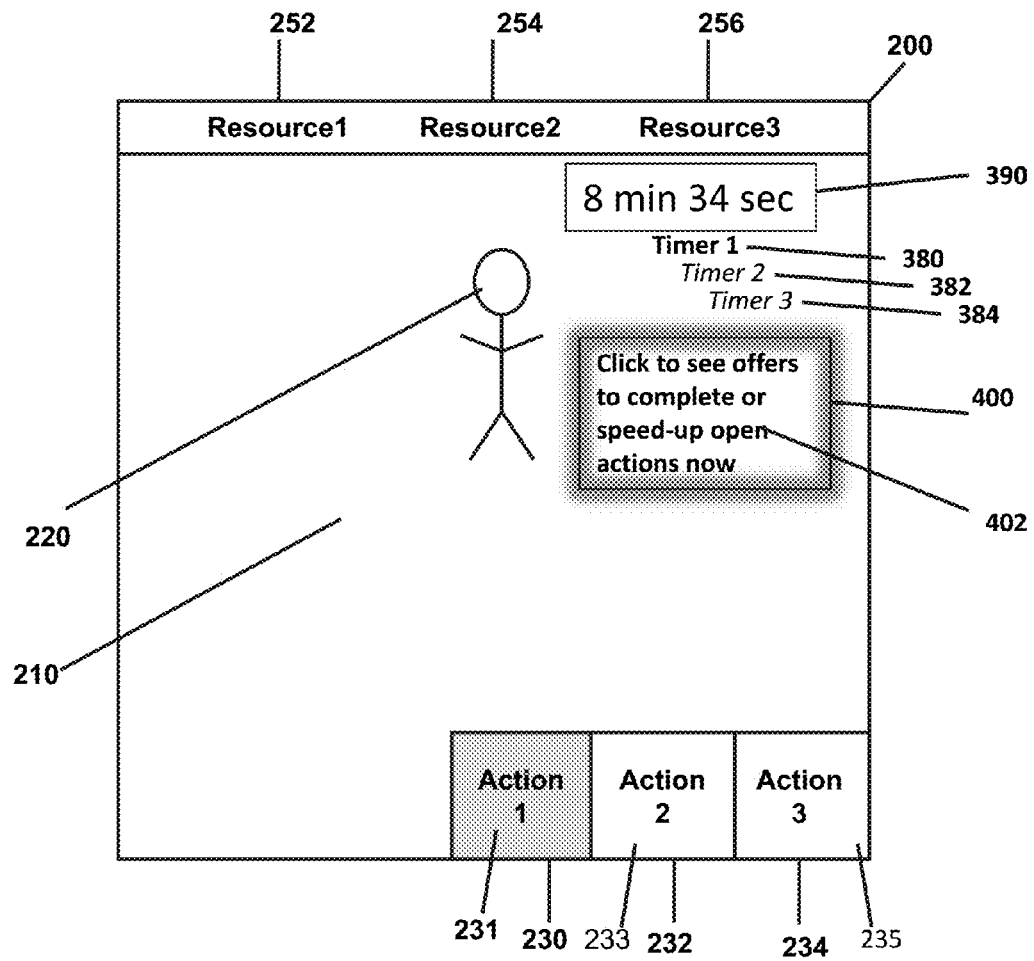
FIG. 4 illustrates a virtual space interface wherein a user has selected an action associated with a wait time and the virtual space interface is displaying a speed-up offer.

FIG. 4 illustrates a virtual space interface wherein a user has selected an action associated with a wait time and the virtual space interface is displaying a speed-up offer. FIG. 4 illustrates an embodiment of a virtual space interface 200 after a user has selected action 230. Game component 108 may determine, based upon a predetermined threshold (not shown), that a threshold of a total time duration was exceeded. Another example threshold may be based on when the wait time 380 is over the threshold that the particular user did not like to wait in the past. For example, game component 108 may keep track of the a parameters that notes user impatience, such as the fact that a user may have clicked on the action button repeatedly despite the first action 230 having its indicator 231 set. Other threshold determinations are included in the scope of the disclosure. When a threshold is exceeded, the speed-up quest offer management component 114 may present a speed-up quest offer presentation 400. As described above, a speed-up quest offer main notification 400 may be a popup window, a message, an alert, a banner, a decision, and/or other methods for display. Content of the speed-up quest offer main notification 400 may be any information that details the available speed-up quest offer options that have been generated by the speed-up quest offer management component 114.

As stated above, parameters used to make determinations by the speed-up quest offer management component 114 may be stored in a speed-up quest offer parameter component 116. Speed-up quest offer parameters may include information of quests(s) which have been partly completed, short duration quests (e.g., quests that typically take up a fraction of the currently active wait time 380), quests likely to be chosen by the user based on past user experience, quests most liked by the user's demographic, etc. When a user is interested to see what speed-up quest offers are available, the user may select the speed-up quest offer main notification 400 in any way. For example, as illustrated in FIG. 4, speed-up quest offer management component 114 may present content 402, which explains to the user the available options. The user may comprehend the content 402 and decide to select a speed-up quest offer main notification 400 for more information.

Figure 5:
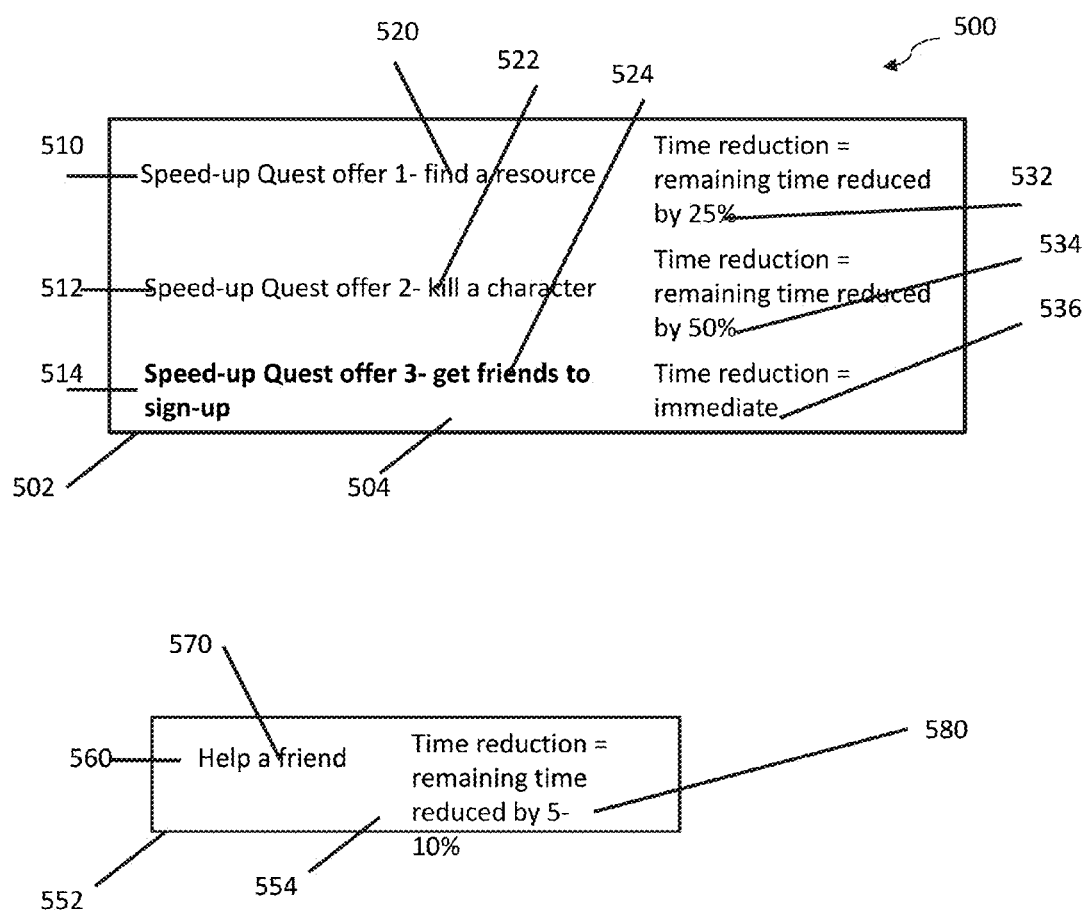
FIG. 5 illustrates embodiments of example speed-up offers.

FIG. 5 illustrates embodiments of example speed-up offers. When the user selects to view what offers are available, the speed-up quest offer management component 114 may present the available offer(s) as illustrated in FIG. 5. FIG. 5 illustrates other embodiments of a speed-up quest offer main notification 500, which may be presented as an alternative to the example speed-up quest offer main notification 400 illustrated in FIG. 4. Content of notification 500 has more information than content of main notification 400. As such, the speed-up quest offer management component 114 may initially present the user with a small amount of content (e.g., via main notification 400) regarding the speed-up quest offer(s) or a larger alternative amount of content (e.g., via main notification 500) depending upon the design of the particular game and platform 104.

Either way, the user becomes made aware of the available offer(s) by a main notification 400, 500 and a subsequent notification (i.e., sub-notification 502). Sub-notification 502, may be similar to the main notification 400, 500 and may be shown at any time (and also may be shown in place of other offer notification(s)) after the speed-up quest offer management component 114 determines that at least one speed-up quest offer is available. In this example, the speed-up quest offer sub-notification 502 includes content 504 including one or more available speed-up quest offer individual notification (e.g. 510, 512, 514). For example, a first individual speed-up quest offer notification 510 offers the user a first speed-up quest activity type 520 e.g., finding a resource. The first speed-up quest offer notification 510 includes a first speed-up time 530 e.g., a 25% reduction in remaining wait time. In another example, a second speed-up quest offer 512 includes a second speed-up quest activity type 522 e.g., killing a character. The second speed-up quest offer notification 512 includes second speed-up time 532 e.g., a 50% reduction in remaining wait time. In another example, a third speed-up quest offer 514 includes a third speed-up quest activity type 524 e.g., get friend to sign up. The third speed-up quest offer notification 514 includes a third speed-up time 534 e.g., an immediate completion of remaining wait time. These speed-up quest activities and speed-up quest times are merely examples and by no means limit the scope of the disclosure. Other activities and times may be used with the embodiments disclosed herein.

As stated above, a speed-up quest offer management component 114 may generate speed-up quest offer(s). Also, the system 100 may further comprise a separate speed-up offer generation component (not shown) configured to generate a speed-up quest offer. The speed-up quest offer may be based upon a remaining action time of the game wait time. For example, if the game requires more resources due to a large number of gaming parameters and decision processes, the system 100 may be designed to have a separate component for generating speed-up quest offers. For example, a speed-up offer generation component (not shown) may be configured to generate a speed-up quest offer notification 510 to be presented on the client computing device, wherein the notification includes a quest activity type (e.g., 520) and the quest speed-up time (e.g., 530) configured to advance the game action requiring the game wait time within the instance of the online game.

Additionally, when a user may be new or unfamiliar with speed-up quest offers or when a user requests more information about what a speed-up quest offer feature is, a game component 108 may be configured to educate a user of what a speed-up quest offer feature is. For example, a game component may present a notification (not shown) that explains to the user that game play that is on hold may be sped-up without having to pay hard currency or having to use up in game resources may be accomplished by successful completion of a quest, which includes controlling game entities in the online game to perform one or more activities in the online game.

In another embodiment, the speed-up management component 114 may be configured to generate a speed-up quest offer that is automatically issued to a game entity when the game entity performs a speed-up quest activity unbeknownst to the user until the speed-up quest activity is completed. For example the game component 108 may monitor for a sequence of game actions that will automatically upon completion implement a speed-up or advancement or completion of any existing open wait times. The game action sequence may be hidden or secret from the user until completion. For example, a speed-up generation component may be configured to generate a notification that the game entity has achieved the speed-up quest, and the speed-up management component 114 may be configured to generate a notification of an amount of speed-up time gained.

In another embodiment, the system 100 may include a quest monitoring component 118 configured to detect successful performance of speed-up quests by the user in the online game. In another example, the speed-up quest management component 114 may present the user with a more immediate speed-up quest offer. For example, referring back to FIG. 3 and FIG. 5, after a user has selected a first action (e.g., action 1 (230)) which has an associated wait time that meets a threshold, a speed-up quest offer management component 114 may generate an individual speed-up quest offer notification 550. An individual speed-up quest offer notification 550 may be generated as soon as the user is detected to have selected the first action 230 again while the action is on hold as it is waiting for its respective wait time to run out or expire. For example, individual speed-up quest offer notification 550 may be presented over or near the location of the icon of the first action 230 or some location on the virtual space 210 where the user is determined to be expected to focus. Individual speed-up quest offer notification 550 may include content 554 which includes information of a speed-up quest activity type 570 e.g., helping a friend, and a respective speed-up time 580 e.g., a 5-10% reduction in remaining time.

In another embodiment, the system 100 may include a speed-up implementation component 118, which may accelerate the remaining wait time by implementing the speed-up time. For example, a speed-up implementation component may be configured to implement speed-ups associated with the speed-up quest offers on open wait times in the online game in response to successful performance of offered speed-up quests. After successful performance of the speed-up quest by the user in the online game during the first open wait time, a speed-up implementation component may implement a speed-up by reducing the open wait time. For example, a speed-up implementation component may speed-up an open wait time by a factor that scales based upon a degree of difficulty of the speed-up quest offer. A speed-up quest offer parameter component 116 or management component 114 may store a table or other format that relates a difficulty of a type of speed up quest activity with a respective speed-up time.

As illustrated in FIG. 5 an example speed-up quest offer may include any one or more of the following: a main notification 500, 552 a sub-notification 502, content 504, 554, a quest activity type 510, 560, a speed up time 532, 580. A speed-up quest offer may include an option for the user to select engagement in a quest that is separate from the game action that requires an associated game wait time. The quest may include defeating a player or helping an alliance member. As described above, other speed-up quest offers and respective times are included in the scope of the disclosure herein. For example, the system 100 may include a speed-up offer generation component (not shown) that may be configured to generate a speed-up quest offer notification (e.g. 400, 500, 552) to be presented on the client computing platform (e.g., 104). The notification may include information that includes a speed-up time amount notification (e.g., 532, 534, 536, 580) configured to notify the user that the game action that requires a respective game wait time may be sped up or has been sped up by a time that is scaled depending on difficulty of a mission of the quest. The speed-up time amount may roughly represent about 5-10% of the total respective game wait time.

Figure 6:
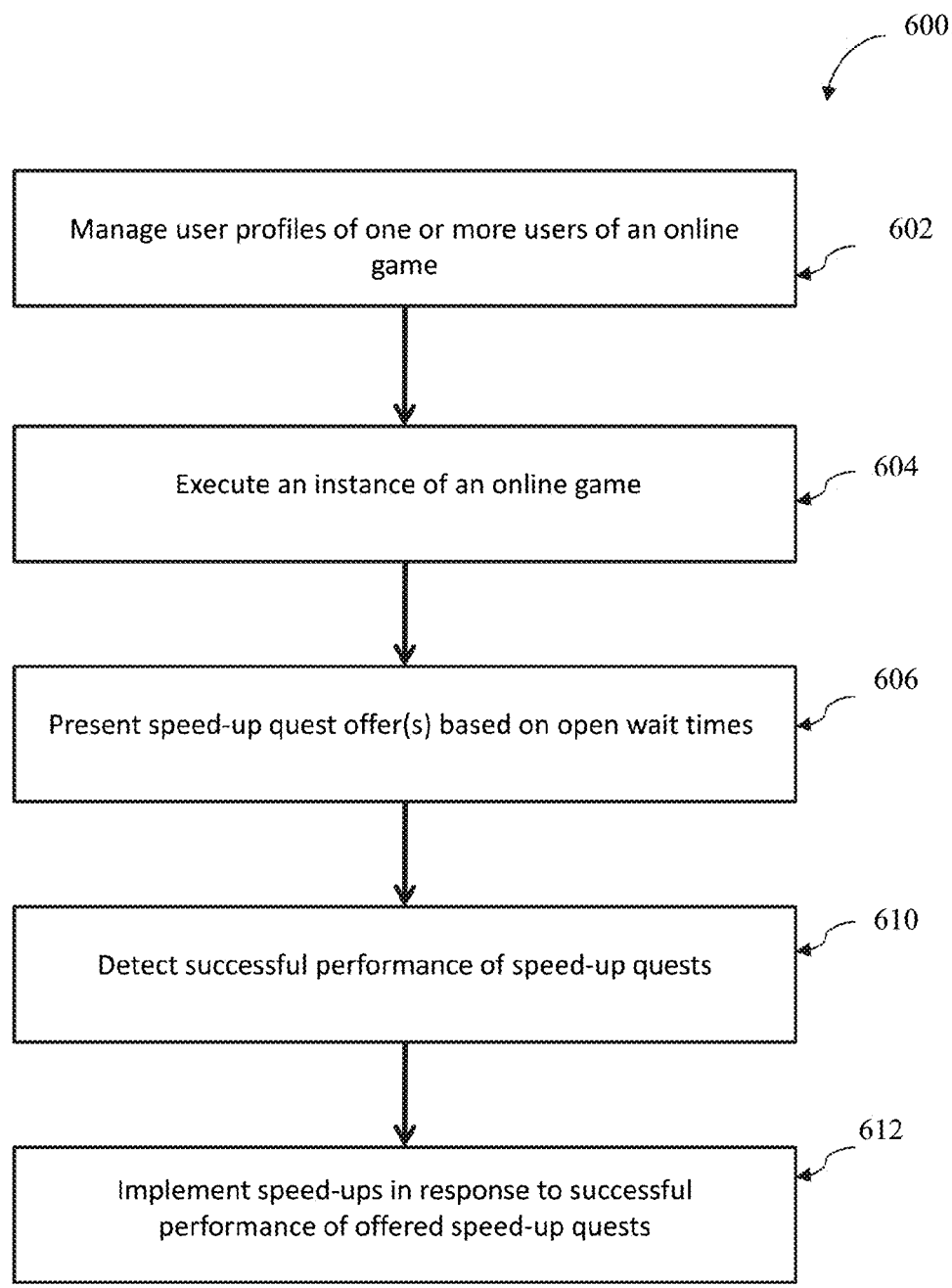
FIG. 6 illustrates a method of hosting a virtual space to client computing devices for interaction by users, including providing speed-up quest offers to users during idle time.

FIG. 6 illustrates a method of hosting a virtual space to client computing devices for interaction by users, including providing speed-up quest offers to users during idle time. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, management of user profiles may be executed. Operation 602 may be performed by a user profile management component that is the same as or similar to user profile management component 106, in accordance with one or more implementation.

At an operation 604 an instance of an online game may be executed. The instance of the online game may facilitate participation of the user in the online game via a client computing platform. Facilitating participation in the online game may include executing actions in the instance of the online game in response to receiving action requests from the user. Execution of the actions may be delayed from reception of corresponding action requests by wait times associated with the actions. Operation 604 may be performed by a game component that is the same as or similar to game component 108, in accordance with one or more implementation.

At an operation 606 an instance of a virtual space may be executed. Operation 606 may be performed by a space component that is the same as or similar to space component 110, in accordance with one or more implementation.

At an operation 608, presentation on the client computing platform of speed-up quest offers may be effectuated to the user for wait times that are open. A first speed-up quest offer may set forth a first quest performable by the user in the online game during a first open wait time for an associated first action requested by the user. Operation 608 may be performed by a component that is the same as or similar to speed-up offer management component 114, in accordance with one or more implementation.

At an operation 610, successful performance of speed-up quests by the user in the online game may be detected. Operation 610 may be performed by a component that is the same as or similar to speed-up offer management component 114 or a dedicated quest monitoring component, in accordance with one or more implementation.

At an operation 612, Implementation of speed-ups in response to successful performance of offered speed-up quests may be implemented. Operation 612 may be performed by a component that is the same as or similar to speed-up offer management component 114 or a dedicated a speed-up implementation component, in accordance with one or more implementation.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to speed up game actions requiring a wait time in an online game, the system comprising:
   one or more physical computer processors configured by machine-readable instructions to:
   manage user profiles of one or more users of the online game;
   execute an instance of the online game, and to implement the instance of the online game to facilitate participation of the user in the online game via a client computing platform, wherein facilitating participation in the online game includes executing actions in the instance of the online game in response to receiving action requests from the user, and wherein execution of the actions are delayed from reception of corresponding action requests by wait times associated with the actions;
   effectuate presentation on the client computing platform of speed-up quest offers to the user for wait times that are open, wherein a first speed-up quest offer sets forth a first quest performable by the user in the online game during a first open wait time for an associated first action requested by the user;
   generate a speed-up quest offer notification to be presented on the client computing platform, wherein the notification includes a first quest activity type and a first quest speed-up factor or a first quest speed-up time configured to advance the first action requiring the first open wait time within the instance of the online game;
   detect successful performance of speed-up quests by the user in the online game; and
   implement speed-ups associated with the speed-up quest offers on open wait times in the online game in response to successful performance of offered speed-up quests by the user in the online game such that in response to detection of successful performance of the first quest in the online game during the first open wait time, a first speed-up is implemented by reducing the first open wait time.

2. The system of claim 1 wherein the one or more physical computer processors are further configured to manage one or more speed-up quest offers per user.

3. The system of claim 1 wherein the one or more physical computer processors are further configured to manage more than one speed-up quest offer per user, and to effectuate presentation of a speed-up quest offer wall rendering on the client computing platform, the speed-up quest offer wall rendering including detailed information about individual ones of the multiple speed-up quest offers.

4. The system of claim 1 wherein the online game is a strategy game and the speed-up quest offer is not configured to be activated by payment or use of game resources or hovering over an icon or watching advertising or winning a luck game.

5. The system of claim 1 wherein the online game is a strategy game and the game action that requires an associated game wait time is building a base.

6. The system of claim 1 wherein the online game is a strategy game and the game action that requires an associated game wait time is training troops.

7. The system of claim 1 wherein the game action that requires an associated game wait time is performing an upgrade.

8. The system of claim 1 wherein the one or more processors are further configured by machine readable instructions such that a single queue exists for the game action that requires an associated game wait time.

9. The system of claim 1 wherein the one or more processors are further configured by machine readable instructions such that multiple queues exist for the game action that requires a respective game wait time.

10. The system of claim 1 wherein the one or more processors are further configured by machine readable instructions such that multiple queues for multiple game actions exist, each of which requires a respective game wait time.

11. The system of claim 1 wherein the speed-up quest offer includes an option for the user to select engagement in a quest that is separate from the game action that requires an associated game wait time.

12. The system of claim 1 wherein the one or more processors are further configured by machine readable instructions to determine whether to generate a speed-up quest offer, based upon the instance of the online game.

13. The system of claim 1 further wherein the one or more processors are further configured by machine readable instructions to determine whether to generate a speed-up quest offer, based upon a level associated with a game entity associated with and/or controlled by the user.

14. The system of claim 1 wherein the one or more processors are further configured by machine readable instructions to track a remaining action time of the game wait time.

15. The system of claim 1, wherein the one or more processors are further configured by machine readable instructions to generate a speed-up quest offer based upon a remaining action time of the game wait time.

16. The system of claim 1 wherein the one or more processors are further configured by machine readable instructions to educate the user of what a speed-up quest offer feature is.

17. The system of claim 1 wherein the one or more processors are further configured by machine readable instructions to:
   generate a speed-up quest offer that is automatically issued to the game entity when the game entity performs the speed-up quest activity unbeknownst to the user until the speed-up quest activity is completed;
   generate a notification that the game entity has achieved the speed-up quest; and
   generate a notification of an amount of speed-up time gained.

18. The system of claim 1 wherein the speed-up quest offer includes an option for the user to select engagement in a quest that is separate from the game action that requires an associated game wait time, and the quest includes defeating a player or helping an alliance member.

19. A system configured to speed up game actions requiring a wait time in an online game, the system comprising:
one or more physical computer processors configured by machine-readable instructions to:
manage user profiles of one or more users of the online game; execute an instance of the online game, and to implement the instance of the online game to facilitate participation of the user in the online game via a client computing platform, wherein facilitating participation in the online game includes executing actions in the instance of the online game in response to receiving action requests from the user, and wherein execution of the actions are delayed from reception of corresponding action requests by wait times associated with the actions;
effectuate presentation on the client computing platform of speed-up quest offers to the user for wait times that are open, wherein a first speed-up quest offer sets forth a first quest performable by the user in the online game during a first open wait time for an associated first action requested by the user;
generate a speed-up quest offer notification to be presented on the client computing platform, wherein the notification includes information that includes a speed-up time amount notification configured to notify the user that the first action that requires a respective game wait time including the first open wait time may be sped up or has been sped up by a time that is scaled depending on difficulty of a mission of the first quest, and the speed-up time amount roughly represents about 5-10% of the first open wait time; and
implement speed-ups associated with the speed-up quest offers on open wait times in the online game in response to successful performance of offered speed-up quests by the user in the online game such that in response to detection of successful performance of the first quest in the online game during the first open wait time, a first speed-up is implemented by reducing the first open wait time.

20. A computer-implemented method for speeding up game activity requiring a wait time in an online game, the method being implemented in a computer system that includes one or more physical processors and storage media storing machine-readable instructions, the method comprising:
managing user profiles of one or more users of the online game;
executing an instance of the online game;
implementing the instance of the online game to facilitate participation of the user in the online game;
executing actions in the instance of the online game in response to receiving action requests from the user, wherein execution of the actions are delayed from reception of corresponding action requests by wait times associated with the actions;
effectuating presentation on the client computing platform of speed-up quest offers to the user for wait times that are open, wherein a first speed-up quest offer sets forth a first quest performable by the user in the online game during a open first wait time for an associated first action requested by the user;
generating a speed-up quest offer notification to be presented on the client computing platform, wherein the notification includes a first quest activity type and a first quest speed-up factor or a first quest speed-up time configured to advance the first action requiring the first wait time within the instance of the online game;
detecting successful performance of speed-up quests by the user in the online game; and
implementing speed-ups associated with the speed-up quest offers on open wait times in the online game in response to successful performance of offered speed-up quests by the user in the online game such that in response to detection of successful performance of the first quest in the online game during the first open wait time, implementing a first speed-up by reducing the first open wait time.

21. The method of claim 20 further comprising managing one or more speed-up quest offers per user.

22. The method of claim 20 further comprising managing more than one speed-up quest offer per user, and to effectuate presentation of a speed-up quest offer wall rendering on the client computing platform, the speed-up quest offer wall rendering including detailed information about individual ones of the multiple speed-up quest offers.

23. The method of claim 20 wherein the online game is a strategy game and the speed-up quest offer is not configured to be activated by payment or use of game resources or hovering over an icon or watching advertising or winning a luck game.

24. The method of claim 20 wherein the online game is a strategy game and the game action that requires an associated game wait time is building a base.

25. The method of claim 20 wherein the online game is a strategy game and the game action that requires an associated game wait time is training troops.

26. The method of claim 20 wherein the game action that requires an associated game wait time is performing an upgrade.

27. The method of claim 20 wherein a single queue exists for the game action that requires an associated game wait time.

28. The method of claim 20 wherein multiple queues exist for the game action that requires a respective game wait time.

29. The method of claim 20 wherein multiple queues exist for multiple game actions, each of which requires a respective game wait time.

30. The method of claim 20 wherein the speed-up quest offer includes an option for the user to select engagement in a quest that is separate from the game action that requires an associated game wait time.

31. The method of claim 20 further comprising determining whether to generate a speed-up quest offer, based upon a level associated with a game entity associated with and/or controlled by the user.

32. The method of claim 20 further comprising determining whether to generate a speed-up quest offer, based upon a level associated with a character of the user.

33. The method of claim 20 further comprising tracking a remaining action time of the game wait time.

34. The method of claim 20 further comprising generating a speed-up quest offer based upon a remaining action time of the game wait time.

35. The method of claim 20 further comprising educating the user of what a speed-up quest offer feature is.

36. The method of claim 20 further comprising generating a speed-up quest offer that is automatically issued to the game entity when the game entity performs the speed-up quest activity unbeknownst to the user until the speed-up quest activity is completed, and wherein the method further comprises:
  generating a notification that the game entity has achieved the speed-up quest; and
  generating a notification of an amount of speed-up time gained.

37. The method of claim 20 wherein the speed-up quest offer includes an option for the user to select engagement in a quest that is separate from the game action that requires an associated game wait time, and the quest includes defeating a player or helping an alliance member.

38. A method for speeding up game activity requiring a wait time in an online game, the method being implemented in a computer system that includes one or more physical processors and storage media storing machine-readable instructions, the method comprising:
  managing user profiles of one or more users of the online game;
  executing an instance of the online game;
  implementing the instance of the online game to facilitate participation of the user in the online game;
  executing actions in the instance of the online game in response to receiving action requests from the user, wherein execution of the actions are delayed from reception of corresponding action requests by wait times associated with the actions;
  effectuating presentation on the client computing platform of speed-up quest offers to the user for wait times that are open, wherein a first speed-up quest offer sets forth a first quest performable by the user in the online game during a open first wait time for an associated first action requested by the user;
  generating a speed-up quest offer notification to be presented on the client computing platform, wherein the notification includes information that includes a speed-up time amount notification configured to notify the user that the first action that requires a respective game wait time including the first open wait time may be sped up or has been sped up by a time that is scaled depending on difficulty of a mission of the first quest, and the speed-up time amount roughly represents about 5-10% of the first open wait time; and
  detecting successful performance of speed-up quests by the user in the online game; and
  implementing speed-ups associated with the speed-up quest offers on open wait times in the online game in response to successful performance of offered speed-up quests by the user in the online game such that in response to detection of successful performance of the first quest in the online game during the first open wait time, implementing a first speed-up by reducing the first open wait time.

* * * * *